United States Patent [19]

Harris

[11] Patent Number: 5,281,257

[45] Date of Patent: Jan. 25, 1994

[54] SYSTEM FOR INCREASING EFFICIENCY OF VAPOR PHASE POLLUTANT REMOVAL WITH ON-SITE REGENERATION AND POLLUTANT RECOVERY

[75] Inventor: James M. Harris, Saratoga, Calif.

[73] Assignee: Purus Inc., San Jose, Calif.

[21] Appl. No.: 989,191

[22] Filed: Dec. 11, 1992

[51] Int. Cl.$^5$ .............................................. B01D 53/04
[52] U.S. Cl. ........................................ 95/115; 95/142; 95/147; 95/900; 96/143
[58] Field of Search .................... 55/28, 33, 74, 208, 55/387

[56] References Cited

U.S. PATENT DOCUMENTS

| | | | |
|---|---|---|---|
| 1,420,613 | 6/1922 | Voress et al. | 55/74 X |
| 2,137,605 | 11/1938 | Derr | 55/33 |
| 2,283,989 | 5/1942 | Henry | 55/74 X |
| 2,399,095 | 4/1946 | Burrell et al. | 55/28 |
| 2,449,402 | 9/1948 | Lipkin et al. | 55/74 X |
| 2,768,942 | 10/1956 | Marple, Jr. et al. | 55/74 X |
| 3,049,399 | 8/1962 | Gamson et al. | 55/74 X |
| 3,531,463 | 9/1970 | Gustafson | 260/211.5 |
| 3,727,379 | 4/1973 | Bijleveld et al. | 55/73 |
| 3,798,876 | 3/1974 | Kennedy | 55/59 |
| 3,805,493 | 4/1974 | Kennedy et al. | 55/74 |
| 3,962,129 | 6/1976 | Münzner et al. | 55/74 X |
| 4,056,369 | 11/1977 | Quackenbush | 55/74 X |
| 4,629,476 | 12/1986 | Sutt, Jr. | 55/74 X |
| 4,717,399 | 1/1988 | Audeh | 55/74 X |
| 4,846,934 | 7/1989 | Carberry | 202/177 |
| 5,043,080 | 8/1991 | Cater et al. | 210/748 |
| 5,160,512 | 11/1992 | Talu | 55/28 |

OTHER PUBLICATIONS

"Reactivation and Regeneration of Activated Carbon", In: *Activated Carbon for Water Treatment*, with contribution of Hubele, Roberts, Snoeyink, Zimmer, (Second Edition in English of *Adsorptionsverfahren zur Wasserreinigung*), CH. 8:614–633.

Carter, et al., "Effects of Background Dissolved Organic Matter on TCE Adsorption by GAC" *Journal AWWA* (Aug. 1992), pp. 81–91.

Shen and Wang, *Adsorption Technology for Air and Water Pollution Control* (1992), Lewis Publishers, Mich., CH. 13.

Simpson, "The Separation of Organic Chemicals from Water", Rohm and Haas Fluid Process Chemicals, pp. 1–8.

*Primary Examiner*—Robert Spitzer
*Attorney, Agent, or Firm*—Cooley Godward Castro Huddleson & Tatum

[57] ABSTRACT

A vapor phase adsorption system employing an adsorbent for removing a volatile organic compound from an air stream to produce a purified air effluent in which the adsorbent first adsorbs the compound and is then regenerated by raising the temperature of the adsorbent to a maximum desorption temperature, which employs an improvement which comprises an unloading compound pre-adsorbed on the adsorbent, wherein the unloading compound is an organic compound having a boiling point greater than that of the volatile organic compound and having an equilibrium loading capacity on the adsorbent at the maximum desorption temperature greater than the equilibrium loading capacity of the volatile organic compound.

13 Claims, 8 Drawing Sheets

SYSTEM FOR INCREASING EFFICIENCY OF VAPOR PHASE POLLUTANT REMOVAL WITH ON-SITE REGENERATION AND POLLUTANT RECOVERY

INTRODUCTION

Technical Field

This invention is directed to adsorbent systems for removing organic contaminants from undesired locations in the environment.

Background

Contamination of soil and water with volatile organic compounds (VOCs) has become a common problem. Water can be decontaminated by aeration, or air stripping as it is commonly known. In this process, contaminated water is placed in intimate contact with relatively large volumes of air which allows the volatile organic material to be transferred from the water to the air as vapor. Contaminated soil can be decontaminated by a similar procedure known as soil venting. In this process, a well is drilled into the contaminated region and a vacuum pump is used to withdraw a mixture of air and organic vapor. Both of these processes effectively transfer the VOC from a liquid or solid host into the air.

At one time it was considered acceptable to simply discharge this contaminated vapor into the atmosphere. This disposal method is being rapidly disallowed by regulatory agencies. Alternative methods are incineration, catalytic combustion and adsorption.

High temperature incineration is considered objectionable due to the generation and release of nitrogen oxides formed in the high temperature flame. Catalytic combustion involves the use of lower temperature combustion chambers close to a source of flammable vapors and the use of specialized catalysts which are sensitive to poisoning.

Adsorption is a process by which material accumulates at the interface between a solid and a gas phase. Adsorption onto solid adsorbents has great environmental significance because it can effectively remove pollutants from gas streams and achieve a high degree of purification. Granular activated carbon (GAC) is the most popular adsorbent. In this process, an organic-laden influent stream is passed through a bed of granular activated carbon. Dissolved pollutants are transferred to the solid phase, resulting in a purified gas effluent. Eventually, the GAC becomes saturated, and the spent carbon must be removed from the adsorption vessel and replaced with fresh adsorbent. The saturated carbon is either disposed in a landfill or regenerated in a high temperature furnace or with steam. Both options involve transportation of large volumes of contaminated carbon to the process facility, which must comply with regulations governing the transportation of hazardous materials. The former option is also being rapidly disallowed. Either option represents a significant operating cost. Steam generates large volumes of waste water.

Therefore there exists a need for a process which will remove VOC from an air stream and collect it as liquid condensate of high organic concentration. In many industrial applications, recovery and reuse of certain removed pollutants is possible and desirable, and represents a source of net savings of cost. If destruction of the pollutants is required it can be usually performed by a variety of processes at increased efficiencies due to the high concentration of pollutants in the produced condensate. In addition should transportation of the pollutants become necessary, the related cost is low due to the small volume of material involved.

Relevant Literature

A number of patents describe correcting organic compounds in adsorbents that can be used in the process of the invention. However, they are used in processes that are different from that of the present invention and do not use unloading compounds (described below) to increase efficiency of the recycling process. See, for example, U.S. Pat. No. 3,798,876 to Kennedy entitled "Abatement of Air Pollution from Organic Compounds with Polymeric Adsorbents," U.S. Pat. No. 3,727,379 to Bijleveld et al. entitled "Process for the Purification of Gases and Vapors," U.S. Pat. No. 3,805,493 to Kennedy et al. entitled "Fuel Evaporative Emission Control Based on Polymeric Adsorbents," and U.S. Pat. No. 4,846,934 to Carberry entitled "Soil and Groundwater Remediation System."

SUMMARY OF THE INVENTION

It is an object of this invention to provide a system for removing volatile organic contaminants from air or other gases (and thus indirectly from other materials, such as contaminated soil and water) in a process that allows collection and disposal of the contaminants and regeneration and reuse of the adsorbent used to collect them.

It is a further object of the invention to improve the rate of regeneration of adsorbents in order to increase the economic efficiency of VOC removal processes.

These and other objects of the invention as will hereafter become more readily apparent have been accomplished by providing a vapor phase adsorption system employing an adsorbent for removing a volatile organic compound from a gas stream to produce a purified effluent in which the adsorbent first adsorbs the compound and is then regenerated by raising the temperature of the adsorbent to a maximum desorption temperature, which employs an improvement which comprises an unloading compound pre-adsorbed on the adsorbent, wherein the unloading compound is an organic compound having a boiling point greater than that of the volatile organic compound and having an equilibrium loading capacity on the adsorbent at the maximum desorption temperature greater than the equilibrium loading capacity of the volatile organic compound.

BRIEF DESCRIPTION OF THE DRAWINGS

The invention will be better understood by reference to the following detailed description of specific embodiments when considered together with the figures that form part of this specification, wherein:

FIGS. 2-6 are graphs showing lowering of the desorption isotherm of a typical adsorption/desorption cycle in the presence of an unloading compound of the invention:

FIG. 2—trichloroethylene adsorbed on synthetic polymer (Ambersorb ®563);

FIG. 3 —o-xylene adsorbed on synthetic polymer (Ambersorb ®563);

FIG. 4—dichloromethane adsorbed on synthetic polymer (Ambersorb ®563);

FIG. 5—trichloroethylene adsorbed on carbon (GAC-610); and

FIG. 6—o-xylene adsorbed on carbon (GAC-610).

FIGS. 7-8 are graphs showing the shifting of desorption curves to lower temperatures in the presence of unloading compounds on adsorbents:

FIG. 7—o-xylene adsorbed on carbon (GAC-610); and

FIG. 8—trichloroethylene adsorbed on synthetic polymer (Ambersorb ®563).

DESCRIPTION OF SPECIFIC EMBODIMENTS

The present invention provides a vapor phase adsorption system employing an adsorbent for removing a volatile organic compound from an air stream to produce a purified air effluent in which the adsorbent first adsorbs the compound and is then regenerated by raising the temperature of the adsorbent to a maximum desorption temperature. This part of the system is conventional, as use of elevated temperatures to desorb the adsorbed adsorbate have long been used. However, the present invention specifically employs an improvement which comprises an unloading compound preadsorbed on the adsorbent, wherein the unloading compound is an organic compound having a boiling point greater than that of the volatile organic compound and having an equilibrium loading capacity on the adsorbent at the maximum desorption temperature greater than the equilibrium loading capacity of the volatile organic compound.

Relation of Specific Embodiments to the Overall Process

Figure 1:
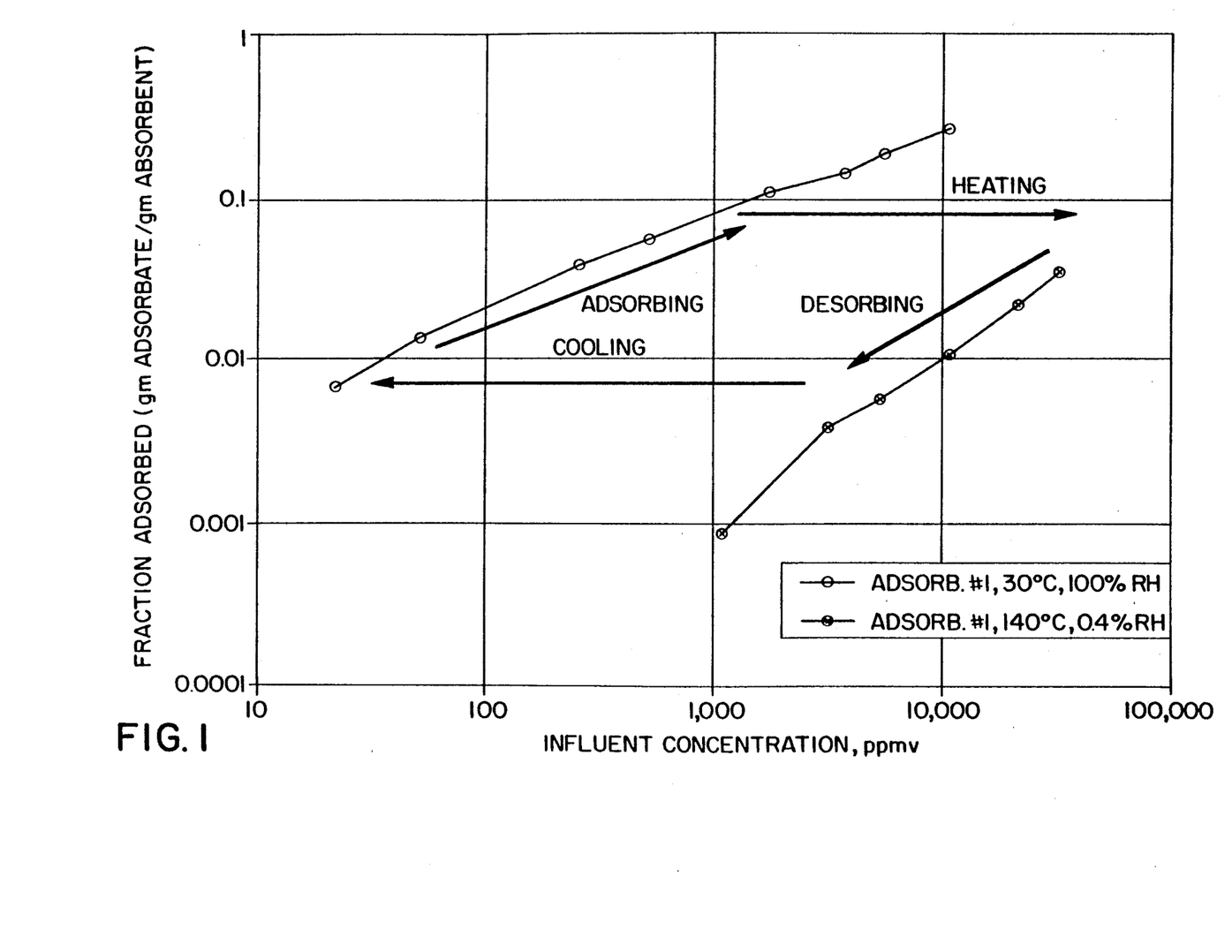
FIG. 1 is a graph showing an adsorption/desorption cycle of adsorbing, heating, desorbing, and cooling of a hypothetical process of the invention.
Figure 2:
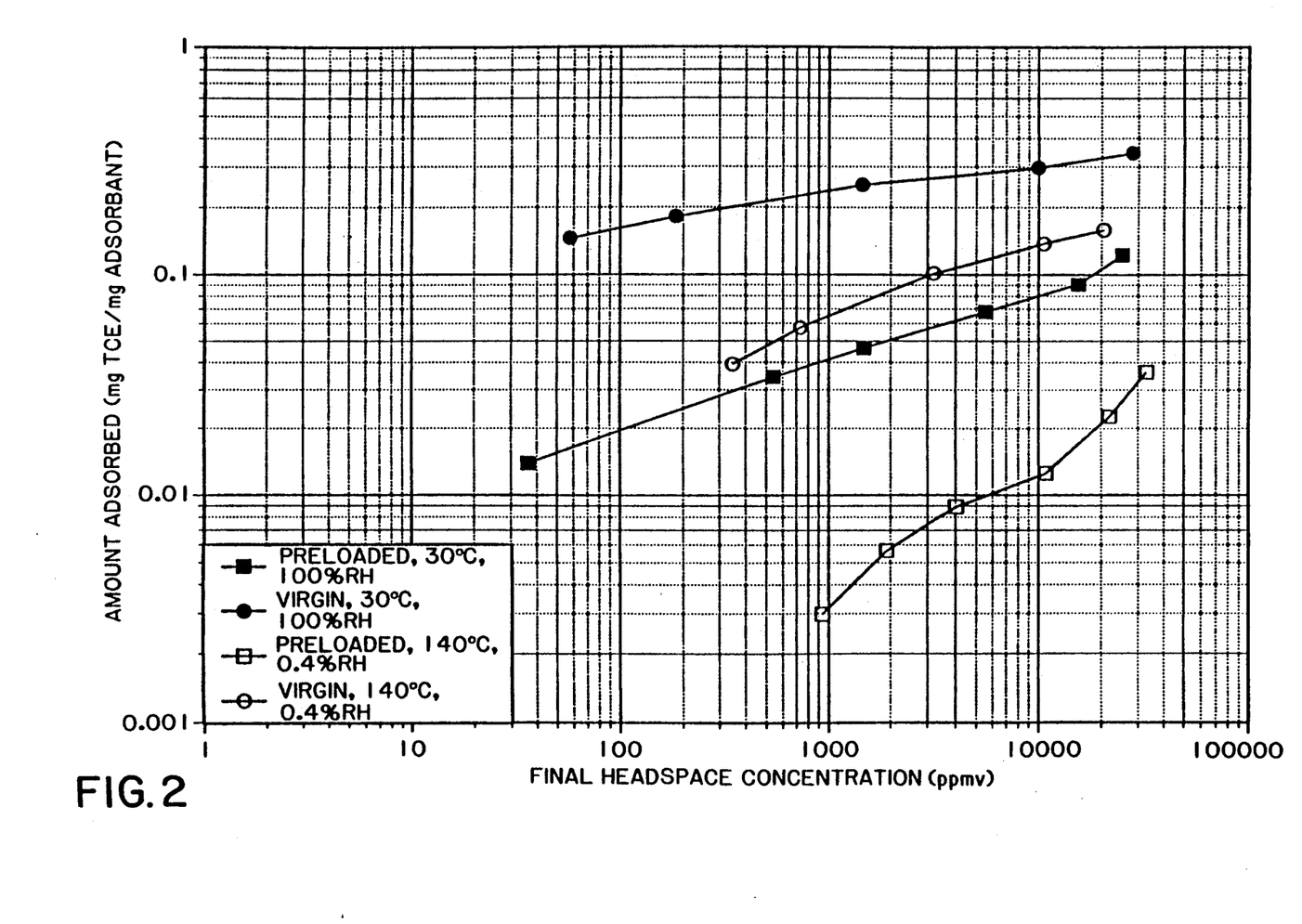
Figure 3:
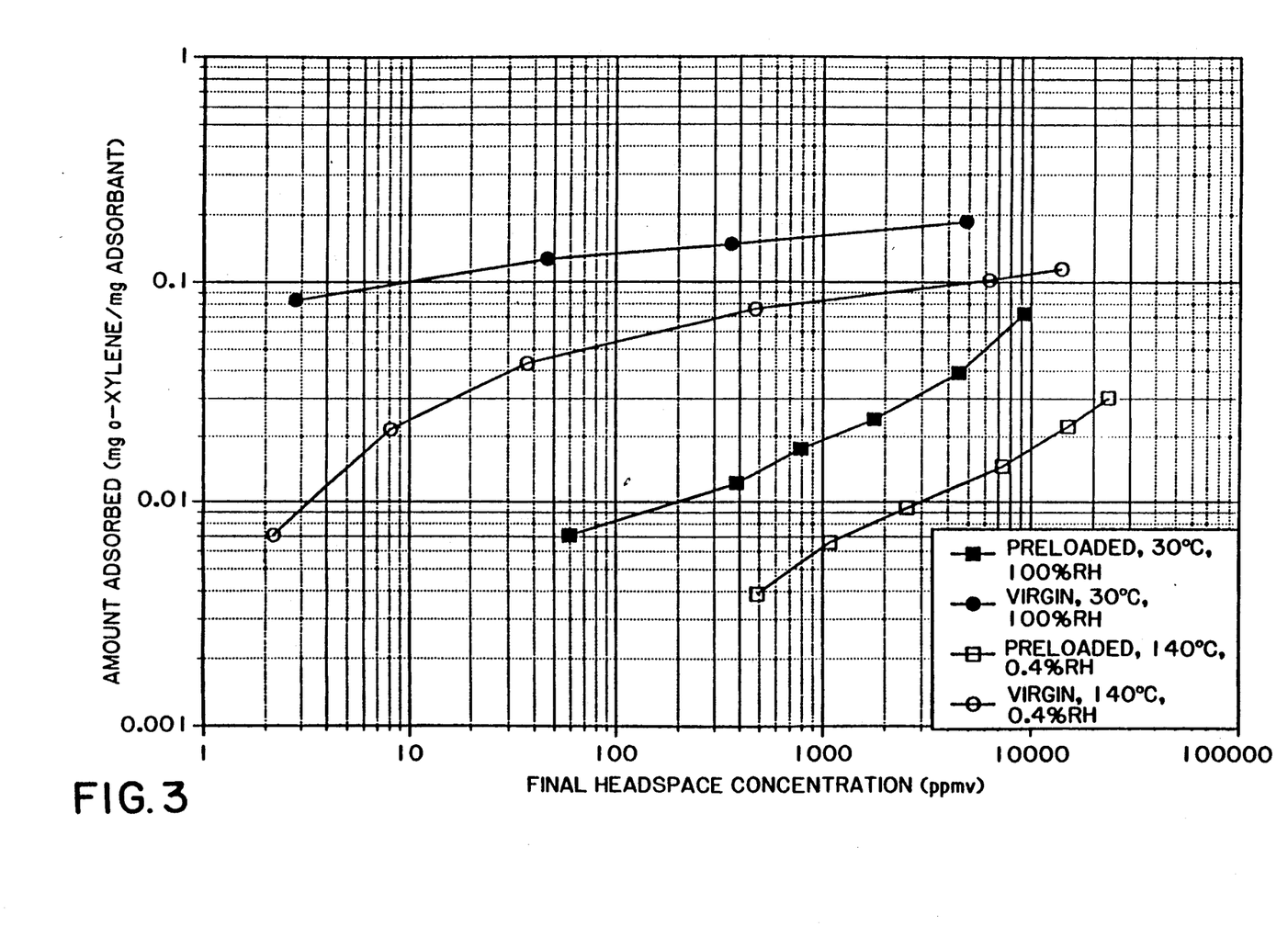
Figure 4:
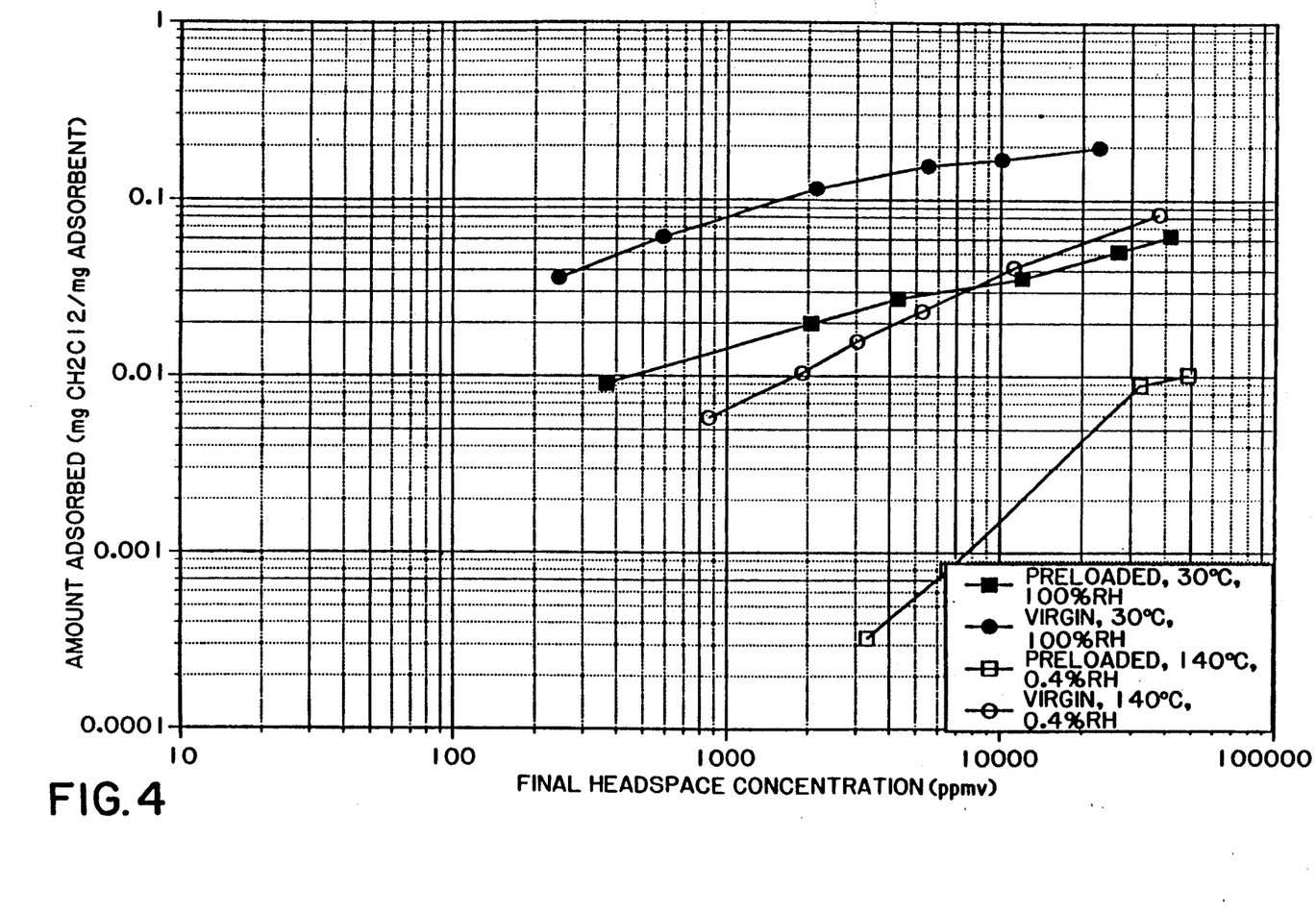
Figure 5:
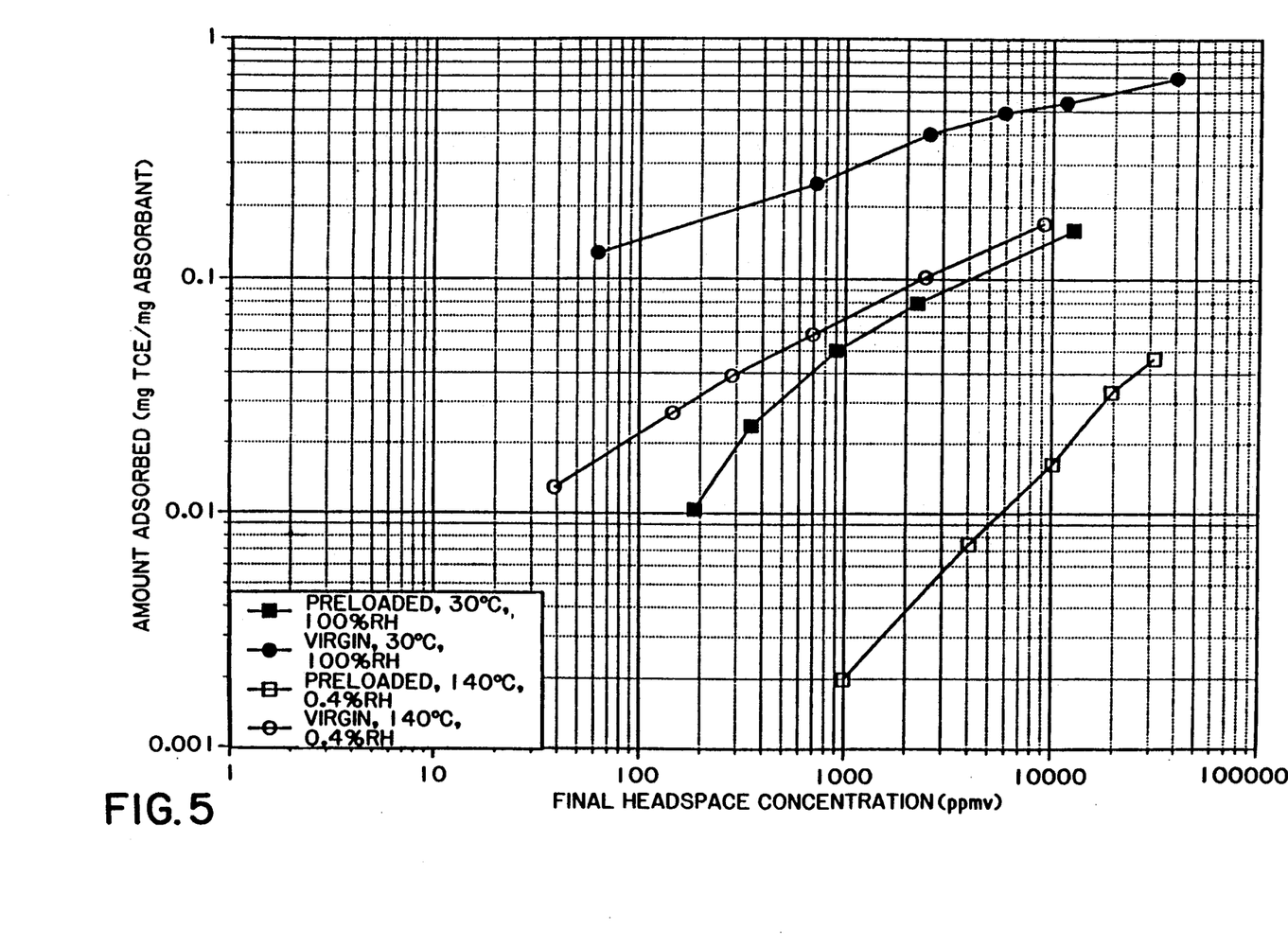
Figure 6:
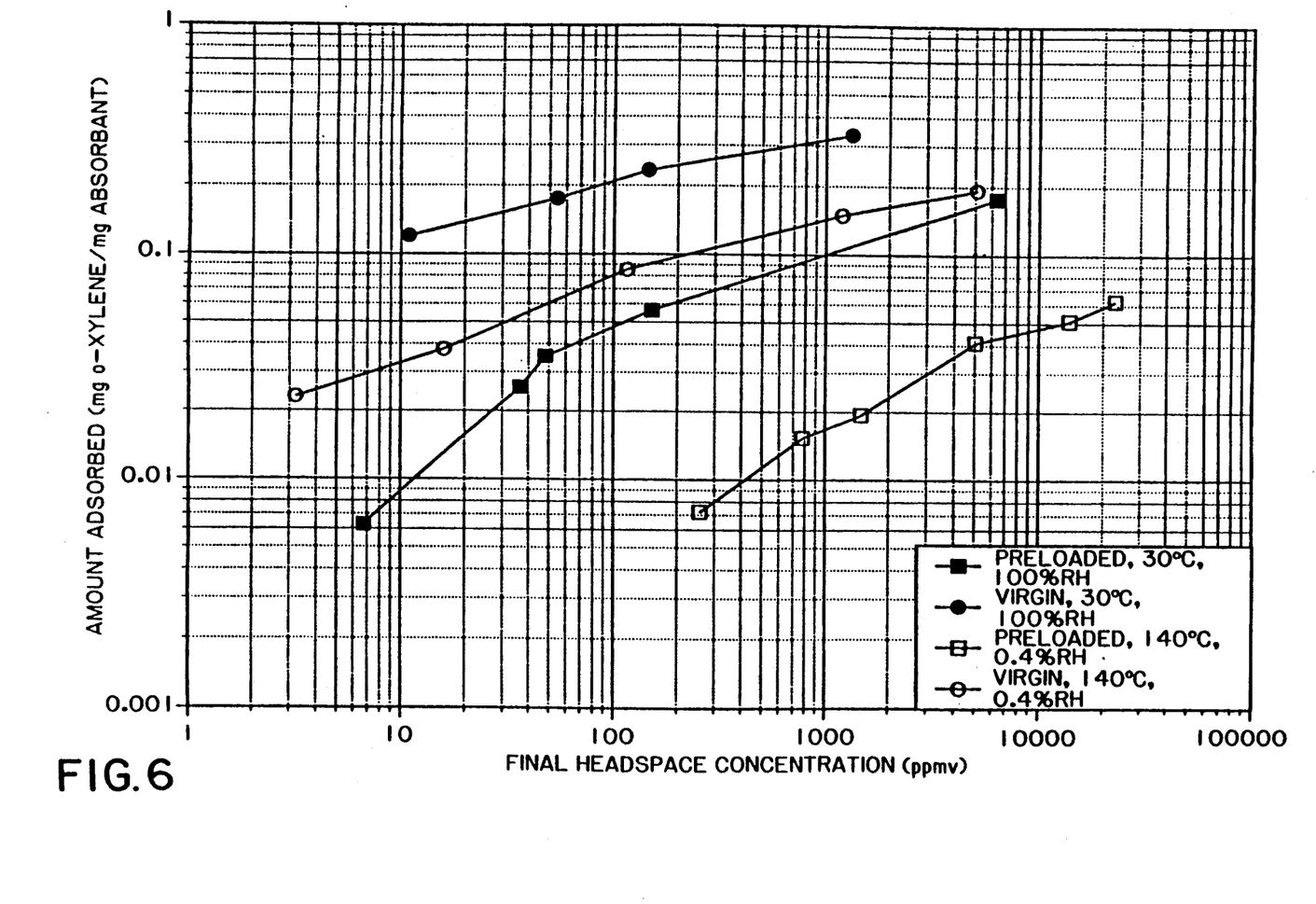

The process of the invention employs synthetic or natural adsorbents that have versatility and adsorptive capacity comparable to that of carbon coupled with increased reversibility. The adsorbents of this invention are used in a fashion similar to that of conventional carbon to produce a purified gas effluent. However, once the adsorbent becomes saturated, it is not replaced. Instead the gas effluent is directed to a second (or further) bed that is part of the same adsorbent system. Subsequently a combination of raised temperature (but still relatively low compared to those used in other techniques), lowered pressure, and purge gas flow is applied to the used bed, and the pollutants are removed and collected in a liquid form. FIG. 1 shows a hypothetical graph of equilibrium loading capacity versus influent concentration at loading and unloading temperatures and illustrates an adsorption/desorption cycle that would occur on such an adsorbent. (These terms are defined below for those not familiar with such cycles.)

The system of the invention overcomes many of the problems associated with earlier adsorption process by including an organic compound referred to herein as an "unloading compound" in the adsorbent prior to starting the adsorption process. This unloading compound acts to prevent high-boiling-point organic pollutants from becoming trapped in the adsorbent over time as the adsorbent goes through multiple cycles. The unloading compound occupies the lowest energy (most tightly bound) sites of the adsorbent, which are the last to be unloaded during the adsorbent regeneration process. They thus assist in the unloading of the adsorbed organic pollutants so that regeneration can occur rapidly and efficiently at lower temperatures than were previously possible, thereby avoiding the high temperatures that previously resulted in polymerization of the high-boiling-point organic remnants in the adsorbent. These unloading compounds are discussed in detail below.

An advantage of using adsorbents preloaded with unloading compounds is that potentially hazardous or extreme conditions (e.g., high temperature) during regeneration of the adsorbent are avoided, and, as a result, transportation of the used bed to a specialized process facility is not required. The bed can be regenerated on-site at relatively low temperatures and returned to the adsorption line either immediately or after another adsorption bed in the same system is used.

The requirements satisfied by this process in order to provide a viable alternative to carbon adsorption include the following:

(1) The time required for the regeneration of the first bed can be designed to be less than or equal to the time available before saturation of the second bed. It is, of course, possible to increase the size of the adsorbing bed and subsequently extend the time before saturation, since the time required for the regeneration of a bed under specified conditions does not in general depend on the bed to size. However, such an approach is not desirable due to the relatively high cost associated with the equipment and the operating cost of large beds versus small beds.

(2) Each bed is able to perform a high number of regeneration cycles. The invention provides adsorption beds that offer improvements in the residual level of contaminants on the bed following a regeneration in order to avoid a cumulative effect over multiple cycles that would otherwise deteriorate the adsorption capacity of the bed in a short time.

(3) The entire process can be fully automated, and the requirements for site personnel are restricted to occasional monitoring of effluent contamination levels to assure compliance with regulation.

(4) The capital investment required for a system employing this process is lower than a comparable system without an unloading compound. The associated operating costs are also significantly lower. In addition, once the remediation of a site is completed, the system can be reused at a different location with similar operational parameters.

Adsorbents

The present invention can be practiced both with natural adsorbents and with synthetic adsorbents. Carbon is the typical natural adsorbent used in most applications. The form of carbon used as an adsorbent is referred to as activated carbon. Such carbon is available in a variety of forms, but generally has a large surface area per unit weight, typically at least 500, preferably at least 800, more preferably at least 1000, square meters per gram. The materials have a pore volume of at least 0.5, preferably 0.7, and more preferably 0.9 ml/g.

However, the decision to use a particular adsorbent for a given adsorbate is not based solely on relative surface area and void volumes. The pores within any adsorbent, including activated carbon adsorbents, vary widely in size (radius) of the pores. It is actually the pore size distribution and not the total surface area or pore volume that determines how well an adsorbent will adsorb in a given situation (i.e., a particular solvent and/or adsorbate). Pore size distribution is determined by the number of pores within a given pore size radius. An adsorbent having a narrow pore size distribution and numerous micropores is particularly suitable for gas-phase adsorption, since the molecules being adsorbed are small and the numerous micropores provide a high surface area per weight of adsorbent. However, the same adsorbent can be inefficient in other processes, such as when adsorbing large molecules. The larger molecules may not be able to enter the smaller pores. In this case, an adsorbent having a pore size distribution with larger pore sizes would be a better choice for an adsorbent, even though the adsorbent would have a lower surface area per weight. Although the techniques of the invention will improve the performance of any combination of adsorbent, adsorbate, and solvent, the optimum combination is best determined by empirical selection.

The invention can be practiced with any adsorbent, such as zeolite, silica gel, or synthetic organic polymers, and is not limited to any particular adsorbent, such as carbon. Carbon is used in the preceding paragraphs of this section merely as an example, and there is no intention here to limit the adsorbents with which the invention is practiced, since the theory of physical adsorption applies equally to any physical adsorbent. Over the last decade, for example, the Rohm and Haas Company and others, e.g. Dow Chemical, have developed a series of commercial, synthetic polymer adsorbents as alternatives to carbon based adsorbents. These products are in the form of hard spherical beads that are non-dusting and attrition-resistant. The polymers have a macroreticular structure characterized by having large surface areas relative to conventional gel structures. The polymers are formed by precipitation in a solvent, and the precipitation process results in trapping of solvent between precipitating portions of the polymer, thereby providing the microporous structure of the finished resin. The macroreticular polymerization technique is applicable to a wide variety of monomers, which can essentially be hydrocarbons or can contain functional groups. For example, Ambersorb ®563 is a sulfonated polymer of divinylbenzene that has been carbonized. Dow XUS-43493 is a copolymer of styrene and divinylbenzene. Polymers of the Amberlite XAD-2 and XAD-4 series are generally copolymers of styrene and divinylbenzene. Amberlite XAD-7 and XAD-8 are acrylic esters. Amberlite XAD-16 is a polymer of divinylbenzene. Amberlite XAD-16 polymeric resin is a particularly useful adsorbent due to its relatively high adsorption capacity and fast adsorption kinetics. However, other adsorbents with similar pore size and chemical composition are evadable and may be used instead of XAD-16. For a description of other adsorbents that can be used in the process of the invention, see, for example, patents listed in the Relevant Literature section above.

Some adsorbents are originally synthetic but are essentially made of a carbonaceous material m their final form. A typical example is Ambersorb ®. The Ambersorb materials are prepared from a sulfonated styrene-/divinylbenzene macroreticular ion exchange resin with a moderate surface area. This resin is then pyrolyzed to form the carbonaceous final product. Ambersorb is available in a variety of different void volumes and other adsorbing properties. Surface areas (BET surface area) range from about 500 to over 1000 square meters per gram.

The adsorption media that are used in the present invention have different binding capacities and binding energies. For example, Amberlite ® XAD-16, Ambersorb ®563, and carbon each have progressively higher binding energies. The loading capacities, i.e., the maximum weight of organic material per weight of adsorption medium, of these three adsorption media follow the same trend.

Some adsorbents, such as carbon, have high capacity during adsorption and also easily desorb low-boiling compounds. High boiling compounds are difficult to desorb from many adsorbents. It appears that there are a large number of low energy states (strong binding sites) in carbon, and the high-boiling compounds can only be driven out of these sites at high temperatures. However, many organic compounds with high boiling points tend to polymerize when heated. Thus, it is difficult to desorb high boiling point compounds from the low energy sites (strong binding sites) of adsorbents.

In the present invention, this problem is overcome by including an unloading compound in the adsorbent before the adsorption process is begun. This unloading compound is preloaded on the adsorbent in a sufficient amount to fill the low energy sites in the adsorbent, thereby preventing high boiling components of a complex mixture from entering these sites. The high boiling point compounds in the pollutant are then more readily removed from the adsorbent during the heating/regeneration process, as they are present on the less tightly bound sites only.

In certain preferred embodiments, a self-contained adsorbent canister for use in the system of the invention is provided. The canister is in the form of a pressure-resistant having an inlet and an exit for gas, each of which is adapted to be connected to the remainder of the system. Sealable ports are preferred in order to prevent evaporation of the unloading compound or contamination of the adsorbent (for example, by adsorption of atmospheric water vapor) during storage. For example, each of the ports can comprise an on/off (open/shut) valve and a threaded fitting for connecting to piping in the adsorption system. An adsorbent will be located in the interior of the canister container, and an unloading compound will be preloaded on the adsorbent, as described herein.

Unloading, Compounds

Selection criteria

Selection and use of unloading compounds can be approached from an understanding of the physical interactions that take place between an adsorbate and the adsorption medium. An adsorption medium has two fundamental characteristics, surface area and surface binding energy. Both are functions of the pore distributions and volumes of the adsorbent and the chemistry of its surface. Published scientific investigations (e.g., Noll et al., "Adsorption Technology for Air and Water Pollution Control," Lewis Publishers, Inc., Chelsea, Mich. 481118, 1992, especially Chapter ME (pp. 256-261) show that the heat of adsorption can be a function of concentration for various compounds on various media. Also see Carter et al., Jour. AWWA, August 1992, pp. 81-91, for a discussion of the theory of adsorption processes. In quantum mechanical terms, the different adsorption sites exist with a continuum of binding energies states which are filled generally in order of lowest to highest energy state (strongest binding to weakest binding). The quantum mechanical model provides that each new molecule of the adsorbate seeks the lowest energy state as it becomes adsorbed. One way in which energy is minimized is by bringing the molecules in contact (as in a liquid) since surface area is then minimized. This is achieved most easily in the smallest pores in the adsorbent, which therefore tend to have the binding sites with the lowest energy states. Ideally, one wants no chemical interaction between the adsorbent and the adsorbate so that the adsorption/desorption process is fully reversible.

The events that occur during unloading of an adsorbate also fit the quantum mechanical view quite well. The higher energy states (sites with lower binding energy) empty first, and the more tightly bound sites depopulate gradually as temperature or some other driving force increases. Unloading at room temperature over time is also easily explained by the quantum mechanical model. Over time the molecules in the lower energy states have a probability of transferring to a higher energy state and escaping the surface entirely.

However, it is not necessary to understand all of the theoretical factors described above in order to select an appropriate unloading compound. Appropriate unloading compounds can be selected from a few physical properties of the candidate compounds and their relationship to the same physical properties of the adsorbate and the adsorbent. In general, the unloading compound will have a boiling point higher than that of the adsorbate being removed (at the pressure in use in the adsorbent during the regeneration process). Preferred unloading compounds have a boiling point at least 25° C., preferably at least 50° C., higher than that of the volatile organic compound being adsorbed. Desorption then takes place at least 15° C., preferably at least 20° C., and more preferably at least 25° C., below the boiling point of the unloading compound in order to desorb the volatile organic compound being adsorbed without removing too much of the unloading compound. Some loss of unloading compound is acceptable, as discussed in more detail below.

Candidate compounds having appropriate boiling points can then be tested for equilibrium loading capacity of the adsorbent being used. Equilibrium loading capacity is the weight fraction of adsorbed material (unloading compound or otherwise) relative to weight of adsorbent after equilibrium is reached under the conditions in question and is usually expressed in percent (i.e., 100 grams of adsorbent having a capacity of 20 grams of adsorbate is referred to as a loading capacity of 20%). Successful candidates (i.e., useful unloading compounds for the conditions being used) will have a dynamic (i.e., non-equilibrium) loading capacity on the adsorbent at the maximum desorption temperature greater than the dynamic loading capacity of the volatile organic compound being adsorbed, preferably by at least 1%, more preferably by at least 2%, and most preferably by at least 3%, of the weight of adsorbent. Dynamic loading capacity will be measured under the conditions (of pressure and otherwise) present in the adsorbent during the desorption cycle for the particular system being used.

Preferred unloading compounds can then be selected from those that meet the basic criteria of boiling point and equilibrium loading capacity based on additional physical and chemical properties. The optimum unloading compound or compounds for a particular system wig vary depending on the %W of adsorbent being used and the conditions under which it is being used. For example, the economics of carbon adsorbents may allow selection of a compound that is stable for as short a time as one week (about 100 cycles), whereas a more expensive resin would require an unloading compound that is stable for about one year (about one-thousand cycles).

The stability question usually applies to the interaction of the adsorbent with the unloading compound, and usually not to the stability of the unloading compound itself, although the unloading compound should be chemically inert under the conditions present during both the adsorbing and desorbing steps. Furthermore, the unloading compound is not required to be indefinitely retained in the adsorbent. In fact, it is acceptable for the unloading compound to dissipate over time, i.e., unload from the adsorbent. The unloading compound is simply then reloaded onto the column before the next adsorption process.

While it is undesirable for the unloading compound to react either with itself or with the adsorbent m more than minimal amounts, stability in fact is more of an economic than an operational issue. The limits of stability are governed by the economics of the recovery process rather than by any scientific principle. If the unloading compound changes its energy state distribution in an undesirable fashion, such as by generating large polymeric molecules that occupy more energy states and therefore result in deterioration of the adsorptive capacity of the adsorbent, then the economics of adsorbent regeneration suffer (i.e., the adsorbent can be used for fewer cycles). However, a relatively unstable but inexpensive unloading compound on an inexpensive adsorbent can compete effectively with a very stable but expensive unloading compound on an expensive adsorbent.

A number of useful characteristics exist for unloading compounds. Not all of these characteristics need to be present in a specific compound, although compounds are more preferred which have more of the indicated properties. These properties are as follows:

(1) The unloading compound is not considered to be a hazardous material.
(2) The unloading compound occupies the lowest energy states (most tightly bound) sites on the adsorbent.
(3) The unloading compound does not change energy state distribution during the process of regenerating the adsorbent.
(4) The unloading compound has a bleed rate (desorption rate) of less than 0.1%/hour at the maximum desorption temperature (usually 200° C. or less), preferably less than 0.02%/hour.
(5) Ability to adsorb onto the adsorbent greater than 3% and less than 10% during a given loading cycle.
(6) The unloading compound can readily be applied to adsorbent at room temperature in either gaseous form or in a suitable solvent.
(7) The unloading compound is chemically stable under the operating conditions of the adsorption and regeneration processes.

As indicated, not all of these characteristics are essential. For example, an unloading compound can be used that desorbs at a higher rate as long as the desorption process occurs in a predictable fashion. For instance, a material can be used that lasts only a cycle or two and then replaced. Such an unloading compound might more accurately be described as a dynamic displacement agent, as it could be added even during the desorption process. For example, xylene can be used as an unloading agent to displace benzene from XAD-16. Xylene can be introduced when the adsorbent bed reaches a predetermined temperature, such as 160° C. The xylene would displace the last portion of contaminant, and some of the displacement agent/unloading compound would remain on the adsorbent. Conditions and compounds would be selected so that the bleed rate would be negligible below 150° C. and the total loading of the displacement agent would stay in the range indicated above. The displacement agent can be introduced, for example, using a temperature-control reservoir in the adsorbent chamber. If desired, the displacement agent could be recaptured selectively from the effluent during regeneration, such as by selecting condenser temperatures that selectively remove the desired component at different temperatures along a condensation line.

An important characteristic of the unloading compound is that it results in a lowering of the temperature used for acceptable desorption of the contaminant of interest without an unacceptable loss of overall adsorptive capacity of the adsorbent. In general pre-loading of an unloading compound will result in a loss of adsorptive capacity very close to the amount (weight fraction) pre-loaded. In other words, if a given adsorbent's loading capacity for a contaminant were 25% at saturation, and 5% (as percent of the adsorbent) of an unloading compound were pre-loaded, then the contaminant loading capacity would now be about 20% at saturation. In some cases a lowering of the acceptable desorption temperature by as much as 75° C. is observed.

The acceptable desorption temperature is defined as that temperature which results in sufficient desorption that when the bed (adsorbent) is returned to service the leakage level (of the contaminant) is acceptable and upon repeated cycling remains acceptable. Thus "acceptable level" may vary from location to location depending upon regulatory and customer requirements. The lower the absolute number, the more difficult the recycling (regeneration) process is and the more critical the proper choice of the maximum desorption temperature and minimum desorption time becomes. In addition to meeting the leakage requirement the maximum desorption temperature must be so low as to minimize or inhibit the formation of any deleterious compounds which would detract from the acceptable life of the adsorbent bed. Acceptable bed life is an economic issue depending upon the cost of the adsorbent material and other operating factors. Acceptability may range from 10 cycles to 10,000. Regardless the operating parameters of the adsorbent bed as defined by the contaminant, the pre-loading compound and amount, the adsorbent loading, the loading and unloading time and temperature cycle must all be compatible with achieving the desired bed life and operating cost. The unloading compound gives the process engineer an additional degree of freedom in how to lower the maximum desorption temperature at a cost of slightly lower adsorptive capacity. The lower maximum desorption temperature allows for a more rapid cycling of the system and thus a lower cost. Additionally, the lower maximum desorption temperature allows for longer bed life either because of lower (or no) formation rates of deleterious compounds and/or because of more complete desorption of the contaminant of interest at an acceptable desorption temperature. This example is given as a conceptual example of the way a "dynamic displacement agent" works; not as a preferred process.

Two parameters that are useful in describing the economics of a desorption system are the loading fraction, $X_f$, and the effective (i.e., observed or achieved in a dynamic operation) maximum desorption time, tm. The loading fraction is weight adsorbate/weight adsorbent. Mathematical analysis indicates that maximizing the ratio $X_f$/tm for any given contaminant/adsorbent combination increases the efficiency of the system. Where the system is ramped to some maximum desorption temperature at a constant rate and then cooled back to ambient at a constant rate the $X_f$/tm can be changed to $X_f/T_m$ where Tm is the maximum desorption temperature. As the present invention is usually practiced, $T_m$ is lowered by increasing the amount of pre-loaded unloading compound. For example, in a system which operates at a maximum temperature about 200° C., the adsorbent bed needs to unload to 99% at a temperature of about 180° C. within less than sixty minutes. Recent data obtained by the present inventors indicates that preloading of Ambersorb ®563 at 6% with trimethylbenzene (TMB) leads to a $T_m$ of about 160° C., whereas preloading at 3% leads to a $T_m$ of about 240° C. for the contaminant trichloroethylene by using a higher pre-loading weight of unloading compound and thereby giving up about 20-25% of the adsorbent capacity, a decrease of 80° C. in unloading temperature occurs, which moves the operation into a region where negligible by-product formation occurs. Accordingly, lower temperatures will favor longer adsorbent life as well as more rapid unloading.

Specific examples of unloading compounds

Compounds useful as unloading compounds include aromatic compounds, particularly benzene derivatives, with sufficient side chains to allow biological metabolism, thereby avoiding additional pollution problems. Of these compounds, methyl-substituted benzenes represent a preferred group of compounds. Xylene is a specific example of such compounds, as is trimethylbenzene. It will be recognized that both xylene and trimethylbenzene are actually mixtures of different isomers. However, the composition of the isomeric mixture is not important to the present invention.

In addition to aromatic compound, aliphatic compounds can also be used. Surprisingly, unsaturated aliphatic compounds can be used as well as saturated ones without chemical decomposition or polymerization during the heating (regeneration cycle), particularly if the double bonds are not conjugated. For example, squalene is a preferred unloading compound. The aliphatic compounds can be substituted with functional groups, particularly carboxylic acid groups and sulfonic acid groups, which can be present as either acids or salts. Preferred aliphatic compounds have at least 15 carbon atoms and up to 40 carbon atoms, preferably 18 to 30 carbon atoms, and are either unsubstituted or contain one or more, usually one, carboxylic acid or sulfonic acid group. Oxygen atoms can be present in the form of ether linkages in the main chain either singly or in multiples, as in poly(ethylene oxide) and its derivatives. Unsaturated aliphatic compounds preferably contain either isolated double bonds or aromatic rings and do not contain, at least in preferred compounds, conjugated double bonds. Aromatic compounds containing aliphatic side chains as described also represent a preferred embodiment of the invention.

The following are specific examples of preferred unloading compounds:

a) squalene;
b) stearic acid;
c) Triton-X ®100;
d) trimethylbenzene;
e) sodium dodecylbenzenesulfonate; and
f) benzoic acid.

Additional unloading compounds can readily be determined from the general criteria discussed above. In addition to the general criteria above, whether a particular compound will be useful for blocking the lowest energy states of the adsorbent is readily determined by a loss of capacity of the adsorbent in parallel with a shifting downward in the unloading isotherm. Saturation of the low energy sites would also be shown as a change in the Freundlich equation parameter n in the formula $$q = KC^n$$

where q is the weight fraction of adsorbate loaded onto adsorbent, C is the influent concentration, and K is the Freundlich constant, which varies with the individual system. The values of K and n can be determined readily from a log-log plot, since $$\log q = \log K + n \log C$$

so that n is the slope of the line and K is the antilogarithm of the intercept. Also see Carter et al., op. cit., for a discussion of the effects of preloading of organic compounds on loss of capacity of the adsorbent in parallel with a shifting downward in the loading isotherm. Although this publication does not address the unloading issues of the present invention, it gives a detailed discussion of the standard experimental procedures used to measure loading isotherms that can be applied to the unloading isotherms as discussed in this paragraph.

For example, FIGS. 2-6 show the effects of preloading of adsorbents with unloading compounds on log-log isotherm plots at typical loading (30° C.) and unloading (140° C.) temperatures for a total of three different contaminants (trichloroethane, o-xylene, and dichloromethane) on two different adsorbents (Ambersorb 563 ®60 and GAC 610 carbon). In all cases preloading with an unloading compound increases the slope of the log-log plot (increases the value of n). Additionally, the graphs demonstrate the increased ease of unloading in the presence of an unloading compound (the same desorbing temperature provides a lower equilibrium loading ft-action of the adsorbate on the adsorbent in the presence of an unloading compound).

Figure 7:
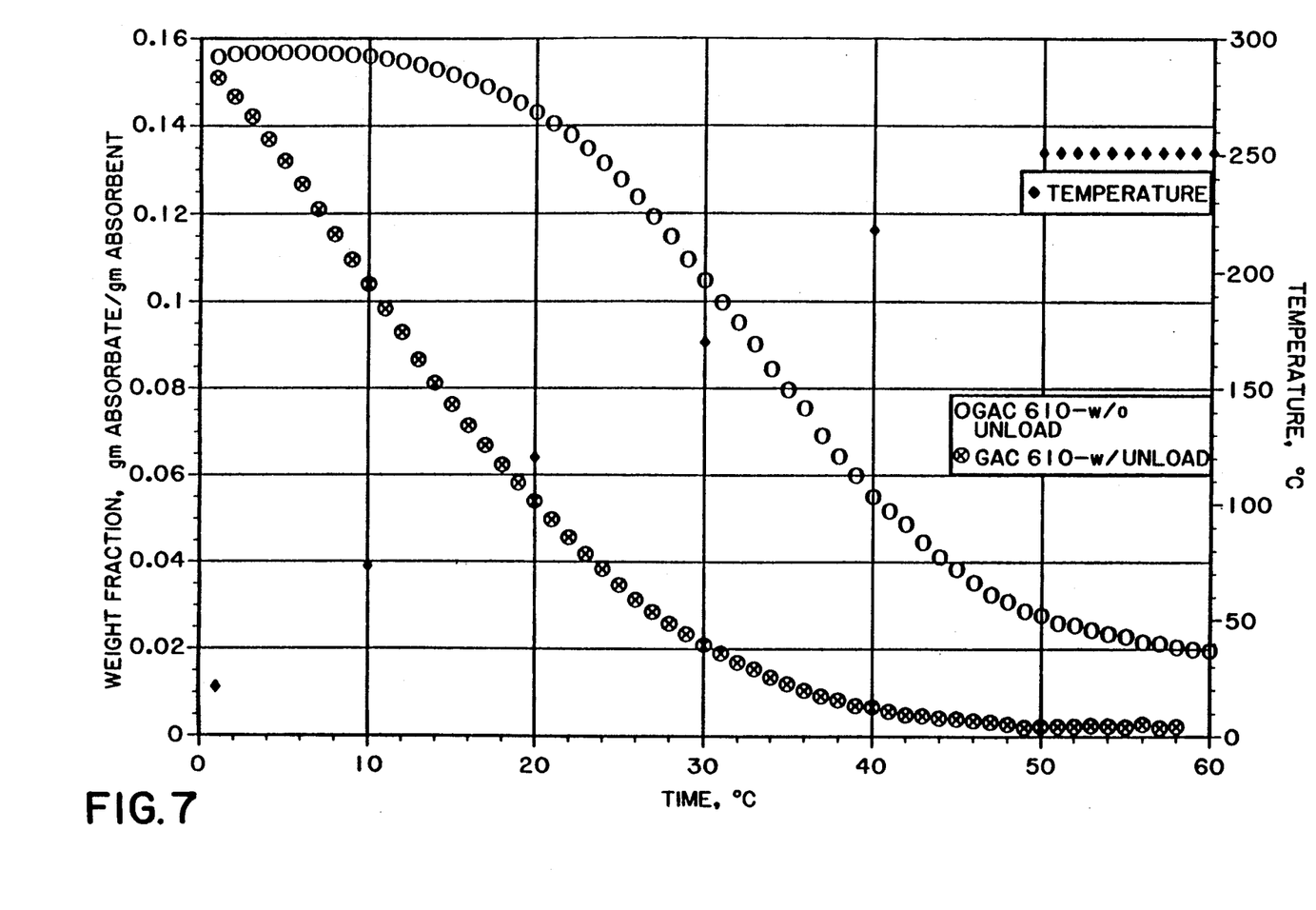
Figure 8:
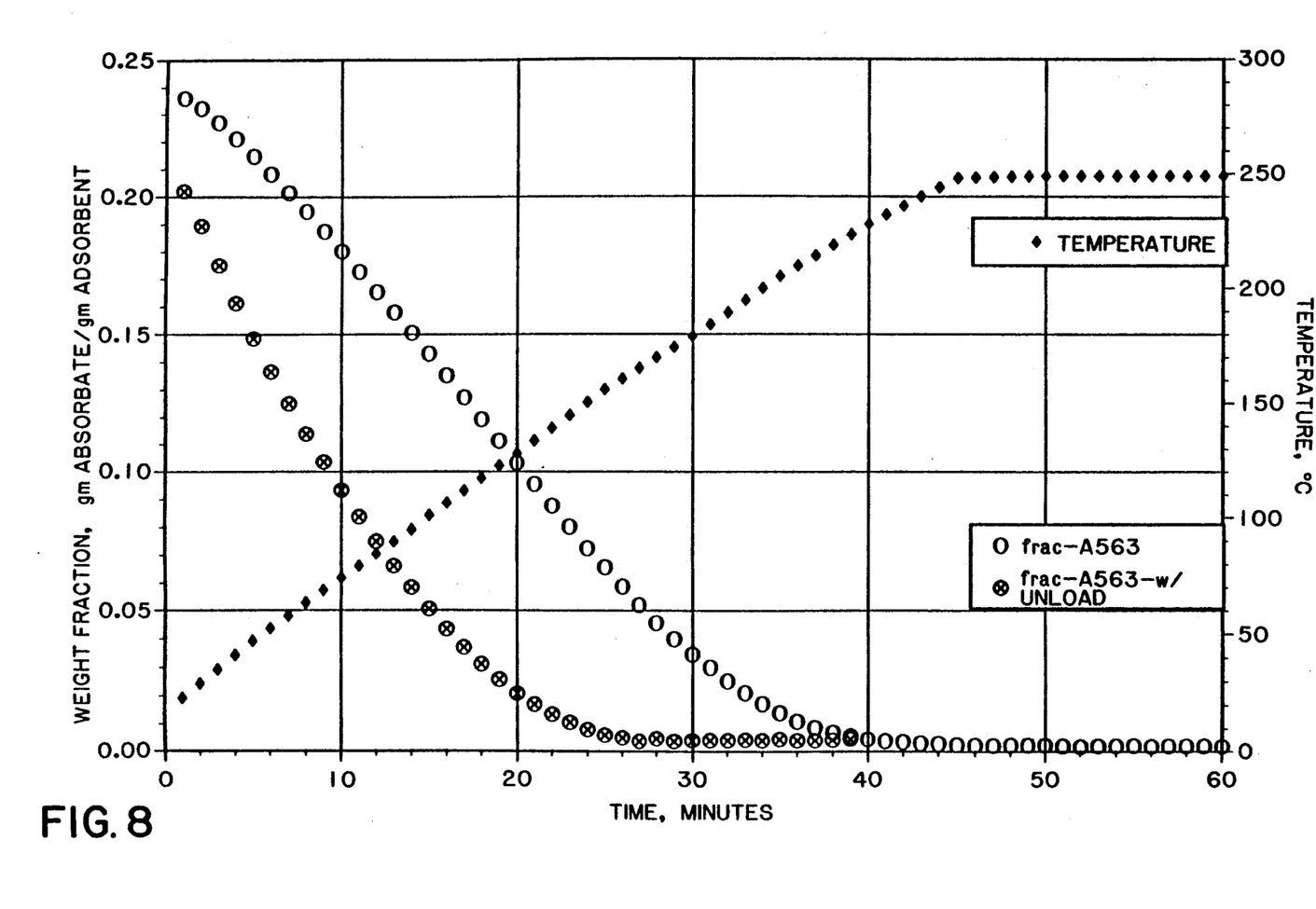

FIGS. 7 and 8 demonstrate the efficiency of unloading compounds in a different format. These figures are graphs of the weight fraction of adsorbate/adsorbent versus time for the unloading of two adsorbate/adsorbent combinations as temperature is increased at a constant rate. FIG. 7 shows o-xylene adsorbed on carbon (GAC-610) and FIG. 8, trichloroethylene adsorbed on synthetic polymer (Ambersorb ®563). In both figures adsorbent without an unloading compound is compared to adsorbent preloaded with an unloading compound, and unloading occurs at lower temperatures for the adsorbent containing an unloading compound.

Adsorbates

The present invention can be practiced with any volatile organic compound as the adsorbate. The method is particularly useful in processes used to remove common organic pollutants, such as chlorinated hydrocarbons (e.g., TCE and TCA, freon), aliphatic hydrocarbons (e.g., gasoline and other petroleum products, hexane), aromatic hydrocarbons (e.g., benzene and toluene), and oxygenated hydrocarbons (e.g., ketones and aldehydes).

One can also divide the material being adsorbed (adsorbates) into groups according to boiling points. For the purpose of this application, compounds that have a boiling point less than or equal to 60° C. are considered to be low boiling, compounds having a boiling point greater than 65° C. but less than 115° C. are considered medium boiling, and compounds having a boiling point more than 115° C. are considered high boiling. Boiling points are measured at one atmosphere of pressure unless otherwise noted.

The relative vapor pressure of an adsorbate under a given set of conditions is representative of the ability of the compound to overcome the binding energy of the particular binding site that it occupies on the adsorbent. Chemical structures of the compounds are not particularly relevant, except to the extent that they affect boiling points (and thus relative ability to overcome adsorbent binding energy). However, since the effects of variations in chemical structure on binding energy are already addressed by the boiling points of the compounds, the boiling point and equilibrium loading fraction properties together are sufficient information to allow the invention to be practiced for a volatile compound of any chemical structure. As will be appreciated, the same is true of unloading compounds, since they are also adsorbates.

Although this description is written for simplicity as if any volatile organic compound being adsorbed is a single compound, it will be recognized that many pollutants (such as gasoline that has escaped from underground storage tanks) are complex mixtures of compounds. In such cases the invention is practiced in the same manner as described, with the unloading compound being selected according to the physical properties of the individual compound or compounds in the mixture that are being removed by the system. For example, an adsorbent system that is intended to remove all of the components of the mixture will use an unloading compound that has a boiling point higher than the highest boiling component of the mixture. In other cases, a deliberate decision can be made not to adsorb the highest boiling components of the mixture (such as by carrying out the adsorption process at a temperature at which some components are not volatile). This is sometimes done with oil spills, as the lighter, lower boding components are more toxic than the higher boiling ones. In such case the unloading compound is selected according to the components of the mixture that are being adsorbed. However, selection of an unloading compound based on the properties of the highest boiling component of the mixture generally gives the best results, since it is the high-boiling compounds that tend to occupy the low energy states of the adsorbent, as previously described. However, use of the invention under conditions that are less than optimal still represents an improvement over the same process in the absence of an unloading compound.

Adsorption and Regeneration Processes

A typical application of the adsorption process and regeneration/desorption cycle is described. Many variations on this overall process are possible, as described below. also see the patents cited above m the section entitled Relevant Literature for more detailed descriptions of standard adsorption/desorption systems, any of which can be converted into a system of the invention by proper use of an unloading compound.

One typical system employs three identical adsorbent beds with interconnecting piping. The influent air is treated by two beds in series at all times, with the first bed acting as the primary adsorbent, and the second bed acting as the "polisher", removing residual pollutants that were not withheld by the first bed. The effluent of the second bed is clean air that can be discharged to the atmosphere. The duration of this cycle depends on the amount of adsorbent, incoming air flow rate, and level and type of contamination. The cycle is completed when the pollutant concentration in the air stream following either the first or the second bed reaches a predetermined percentage of the influent concentration. At that moment the first bed is considered exhausted and it has to be regenerated before it can be further used as an adsorbent.

Meanwhile, the third bed has been isolated from the others, and it has undergone regeneration. The regeneration cycle is substantially shorter in duration than the adsorption cycle, and therefore the third bed becomes available for adsorption before the first bed is exhausted. However, the regeneration occurs at a higher temperature than adsorption, and the bed has to be cooled down before it can be used as an adsorbent. This is achieved by directing the clean and cool air effluent of the second bed through the third bed. The duration of the cooling process depends on the size of the adsorbent bed and the air flow rate, and it normally can be completed in less than one hour.

At the completion of the cooling interval, the incoming air is diverted from the first bed that enters the regeneration cycle. The second bed acts now as the primary adsorbent, and the third bed becomes the polisher. Once the second bed is exhausted and the first bed regenerated and cooled, the third bed becomes the primary adsorbent and the first bed becomes the polisher.

The process is monitored by an on-site computer that opens and closes the pneumatic or electrical solenoid valves. The position of the valves determines which beds and at what sequence will accomplish the adsorption cycle and the bed that is available for regeneration.

Other possible bed arrangements include one bed adsorbing and one regenerating and two beds in series or parallel, adsorbing and two regenerating). These examples are by no means exhaustive, and the particular bed arrangement can be selected based on the requirements for VOC removal (such as air volume, amount of contaminant, and operating temperature), air pressure drop through the system, and other physical conditions of the operation.

Detailed Description of Regeneration of Used Adsorbent

Once the bed is exhausted, it is isolated from the adsorption loop. The regeneration cycle then begins:

(1) By means of a liquid ring vacuum pump (or similar vacuum pump), the bed is initially brought to a low pressure state, typically 15 inches of mercury vacuum. During this process, air that was present in the bed and the isolated portion of the piping is removed. A portion of the organic vapor present in the air is condensed in the seal liquid of the vacuum pump (typically water with a low level of pollutants also present) and collected in the separator. The remaining air flows through the condenser or series of condensers, which remove the majority of residual VOCs and is subsequently exhausted to the incoming safe of contaminated air in the adsorption loop. A low level of oxygen, which is essential for a safe and efficient regeneration, is established.

(2) The vacuum pump is turned off and the vacuum level in the bed is monitored by a vacuum switch. The successful completion of this procedure confirms that the bed is isolated and leak-tight and that regeneration may be safely initiated. Subsequently the vacuum pump is turned on, and clean nitrogen (in batches, cumulatively equivalent to several bed volumes, typically 10) is circulated through the bed and exhausted to the adsorption loop.

(3) The bed can now safely be brought to a higher temperature for regeneration. During this portion of the cycle organic vapors will be present in the bed at very high concentrations. In the presence of oxygen and an ignition source this could have constituted an explosive mixture. However, the environment is oxygen poor, and the liquid ring vacuum pump (which may be coupled to an explosion-proof motor) is intrinsically safe, in the sense that it cannot generate sparks. Possible air leaks into the bed will cause loss of vacuum that will be detected by the vacuum switch. In that case the regeneration process will be automatically terminated, and the on-site computer will issue a request for service.

(4) Heat is then applied to the bed. In a typical application heat is applied, and a fin arrangement internal to the bed promotes quick distribution of the heat in the adsorbent. The temperature is continuously monitored by a number of sensors. A typical regeneration temperature is 180° C. During this portion of the cycle, nitrogen enters the bed, stiff at approximately 15 inches of mercury vacuum. The flow rate varies with the bed size; a typical flow rate would be approximately 2 CFM (cubic feet/minute). The high temperature increases the vapor pressure of the pollutants adsorbed onto the adsorbent which are transferred to the gas phase and replaced in the pore structure of the resin by nitrogen. The gas mixture exits the bed with a very high concentration of pollutants. A portion of the pollutant vapor is condensed in the vacuum pump seal liquid and the remainder comes into intimate contact with a low temperature condenser, typically at 1° C., or a series of condensers depending on the adsorbate. The produced liquid is transferred by gravity to the separator. The remaining gas at low pollutant concentration re-enters the adsorbing bed. The duration of this procedure is determined by the level and type of contaminants on the bed and desired regeneration efficiency.

The following example is offered by way of illustration and not by way of limitation.

EXAMPLE

The invention was demonstrated in an adsorbent system in which the influent air contained the volatile organic contaminant trichloroethylene (TCE) at a concentration of 2500 ppmv and had a relative humidity (RH) of greater than or equal to 95% and a temperature of 22° C. The adsorbent was a bed of Ambersorb 563 which was preloaded with 5% by weight squalene as the unloading compound. The preloading of the squalene unloading compound was carried out by dissolving squalene in hexane, in an amount equivalent to 7% of the weight of the bed and then circulating the hexane-squalene solution through the bed for about 1 hour. The excess hexane-squalene solution was then drained from the bed, the Ambersorb 563 was dried using a standard drying cycle, and the adsorbed hexane was recovered. This process resulted in the adsorbent being preloaded with about 5% by weight squalene.

In a typical cycle during the adsorption phase, the adsorbent was loaded with trichloroethylene by passage of the influent through the adsorbent bed until about 6–8% by weight of TCE was adsorbed. At this point the breakthrough (concentration of TCE in the air stream exiting the adsorbent bed) of the TCE is less than or equal to 10 ppmv. Higher loadings could be allowed if higher breakthrough concentrations can be tolerated. At the end of the adsorption phase, the system was cycled to a desorption phase. The loaded adsorbent bed was isolated and evacuated to a level of greater than or equal to 15 inches of mercury. Nitrogen gas was introduced at a rate of approximately 0.05 bed volumes/minute. Heating of the adsorbent was initiated, and the bed was heated at a rate of 4° C./min to a temperature 180° C. The bed was held at this temperature for about 90 min and then cooled to 50° C. or below in about 50 min. A vacuum of at least 6 inches of mercury was maintained at all times during the desorption phase. After cooling, the bed was ready to be cycled back to the adsorption phase.

The invention now being fully described, it will be apparent to one of ordinary skill in the art that many changes and modifications can be made thereto without departing from the spirit or scope of the appended claims.

All publications and patent applications mentioned in this specification are herein incorporated by reference to the same extent as if each individual publication or patent application was specifically and individually indicated to be incorporated by reference.

What is claimed is:

1. A method for improving efficiency of adsorbent regeneration in a process wherein a volatile organic compound is adsorbed from an air stream into an adsorbent after which adsorbed compounds are removed from said adsorbent by heating said adsorbent to a maximum desorption temperature to provide regenerated adsorbent and said regenerated adsorbent is used to adsorb further amounts of said compound from said air stream, which comprises:
    pre-loading said adsorbent with an unloading compound, wherein said unloading compound is an organic compound having a boiling point $T_o$ higher than the boiling temperature of said volatile organic compound and said unloading compound has an equilibrium loading capacity on said adsorbent at said maximum desorption temperature greater than the equilibrium loading capacity of said volatile organic compound, thereby providing a preloaded adsorbent.

2. The method of claim 1, wherein $T_o$ is at least 25° C. above the boiling point of said volatile organic compound.

3. The method of claim 1, further comprising the step of adsorbing said organic compound onto said pre-loaded adsorbent by passing said air stream through said adsorbent, thereby providing a loaded adsorbent.

4. The method of claim 3, further comprising the step of regenerating said pre-loaded adsorbent by heating said loaded in absence of said air stream at a temperature at least 25° C. below $T_o$ for a time sufficient to remove adsorbed said volatile organic compound from said loaded adsorbent without removing more than 10% of said unloading compound.

5. In a vapor phase adsorption system employing an adsorbent for removing a volatile organic compound from a gas stream to produce a purified effluent in which said adsorbent adsorbs said compound and is then regenerated by raising the temperature of said adsorbent to a maximum desorption temperature, an improvement which comprises:
    an unloading compound preadsorbed on said adsorbent, wherein said unloading compound is an organic compound having a boiling point greater than that of said volatile organic compound and having an equilibrium loading capacity on said adsorbent at said maximum desorption temperature greater than the equilibrium loading capacity of said volatile organic compound.

6. The adsorption system of claim 5, wherein said unloading compound has a boiling point at least 50° C. above that of said volatile organic compound.

7. The adsorption system of claim 5, wherein said unloading compound is an aromatic hydrocarbon comprising a benzene ring and at least one aliphatic hydrocarbon side chain.

8. The adsorption system of claim 5, wherein said unloading compound is an optionally unsaturated aliphatic compound having 15 to 40 carbon atom and 0-2 carboxylic or sulfonic acid groups.

9. The adsorption system of claim 5, wherein said volatile organic compound is a chlorinated hydrocarbon, an aliphatic hydrocarbon, an oxygenated hydrocarbon, or an aromatic hydrocarbon.

10. The adsorption system of claim 5, wherein said adsorbent is a microporous carbon.

11. The adsorption system of claim 5, wherein said adsorbent is a microporous synthetic polymer.

12. The system of claim 5, wherein gas is air and said volatile organic compound is benzene.

13. A self-contained adsorbent canister for use in the system of claim 5, wherein said canister comprises a pressure resistant container, gas inlet and gas exit means adapted to be connected to said system, an adsorbent located in said container, and an unloading compound preloaded on said adsorbent.

* * * * *